(12) United States Patent
Ellsworth

(10) Patent No.: US 7,377,534 B2
(45) Date of Patent: May 27, 2008

(54) BICYCLE FRAMES AND BICYCLES WITH PERMANENT REAR WHEEL FENDERS

(76) Inventor: Anthony S Ellsworth, 16225 Highland Trails Dr., Ramona, CA (US) 92065

( * ) Notice: Subject to any disclaimer, the term of this patent is extended or adjusted under 35 U.S.C. 154(b) by 198 days.

(21) Appl. No.: 11/279,742

(22) Filed: Apr. 13, 2006

(65) Prior Publication Data

US 2007/0241532 A1    Oct. 18, 2007

(51) Int. Cl.
*B62K 19/00*    (2006.01)
(52) U.S. Cl. .................... 280/281.1; 280/274
(58) Field of Classification Search ........... 280/274, 280/275, 281.1, 282, 283, 284, 285, 286, 280/288.2, 288.3
See application file for complete search history.

(56) References Cited

U.S. PATENT DOCUMENTS

| | | | | |
|---|---|---|---|---|
| 606,704 | A | * | 7/1898 | Burgess .................... 280/281.1 |
| 609,171 | A | * | 8/1898 | Stevens .................... 280/281.1 |
| 2,330,560 | A | * | 9/1943 | Descos ....................... 280/274 |
| 2,333,642 | A | * | 11/1943 | Dempsey et al. ......... 280/281.1 |
| 3,233,916 | A | * | 2/1966 | Bowden ...................... 280/274 |
| 4,015,854 | A | * | 4/1977 | Ramond ................... 280/281.1 |
| 4,453,730 | A | * | 6/1984 | Klose ....................... 280/281.1 |
| 4,850,607 | A | * | 7/1989 | Trimble ................... 280/281.1 |
| 5,398,954 | A | * | 3/1995 | Chonan ....................... 280/276 |
| 6,889,992 | B2 | * | 5/2005 | Vroomen et al. .......... 280/274 |

FOREIGN PATENT DOCUMENTS

DE          3937368 A1 *   5/1991

OTHER PUBLICATIONS

Photograph of bicycle frame obtained from an internet web site having a URL of www.kestrel-usa.com on Mar. 29, 2006. Applicant is unaware of the author or publication date of the photograph.
U.S. Appl. No. 29/246,461, filed on Apr. 14, 2006 by Ellsworth and entitled "Bicycle Frame".
Jan. 25, 2008 International Search Report and Written Opinion of the International Searching Authority for related International PCT Applicaton No. PCT/US2007/066274.

* cited by examiner

*Primary Examiner*—Lesley D. Morris
*Assistant Examiner*—Marc A Scharich

(57) ABSTRACT

A bicycle frame includes a head tube, a top tube, a down tube, a pair of chainstays, a pair of seatstays, and a rear wheel fender providing structural support to the bicycle frame. A seat tube is provided that does not extend to a bottom bracket of the bicycle. For example, the seat tube can be attached only to the top tube. The bottom bracket can be an integral component of the down tube. Bicycles are also described that include the present bicycle frames.

13 Claims, 2 Drawing Sheets

BICYCLE FRAMES AND BICYCLES WITH PERMANENT REAR WHEEL FENDERS

FIELD OF THE INVENTION

The present invention relates generally to bicycle frames and bicycles. More particularly, the invention relates to bicycle frames and bicycles that include a component other than a seat tube that provides structural support to the bicycle frames and bicycles.

BACKGROUND

Many bicycles can be characterized as having a head tube that accommodates a portion of a front wheel fork assembly, a top tube attached to the head tube and extending rearwardly therefrom, a down tube attached to the head tube below the top tube and extending downwardly and rearwardly to a bottom bracket, and a seat tube attached to the rearward end of the top tube and to the bottom bracket. The seat tube has a bore that accommodates a seat post of a bicycle seat. The seat tube provides structural support to the bicycle frame by being attached to the top tube and down tube of the frame. A chain stay rearwardly extends from the bottom bracket and is attached to a rearward end of a seat stay that is attached to the seat tube near the location that the top tube attaches to the seat tube. The junction region of the chain stay and seat stay includes a receptacle for receiving a rear wheel axle. The various tube structures of existing bicycles are typically welded together to form an integral or rigid bicycle frame.

Some bicycle frames have been designed that do not include a seat tube that extends from the bottom bracket to the top tube of the bicycle frame. These bicycles are typically high performance mountain bikes or road bikes. These seat tubeless high performance bike frames are structured to provide support to a bike rider using different configurations since they do not include a seat tube that connects the top tube and down tube or bottom bracket. For example, certain bike frames include top tubes and down tubes with larger or increased sizes compared to conventional bikes that have seat tubes connecting the top tube and bottom bracket, as described above. Other bike frames include oddly configured seat stays and tube configurations to help provide the desired support. Importantly, these high performance bike frames and bikes are meant to be as light as possible, and therefore, attempts are made to reduce the number of components provided on such bike frames and bicycles.

In view of the above, it can be appreciated that a need remains for new bicycle frames and bicycles that are appealing to consumers and that still provide sufficient structural support to a bike rider.

SUMMARY

The present invention attempts to address this need, as well as other needs and problems associated with existing bicycle frames and bicycles. The present bicycle frames and bicycles are configured to sufficiently support a bicycle rider without including a seat tube that extends from a top tube of the bike frame to a bottom bracket of the bike frame. In the present bicycle frames and bicycles, structural support to the bicycle frame, such as the top tube, is provided by a rear wheel fender that is permanently attached to the top tube and down tube of the bicycle frame. In comparison to existing high performance bicycle frames that do not have a seat tube and that provide frame support without adding additional components, the present bicycle frames provide support to the bicycle frame, which may have been previously provided by a seat tube, by adding an additional component to the frame.

Embodiments of the present invention include bicycle frames and bicycles that include a rear wheel fender permanently attached to a top tube and down tube of the bicycle frame. The present bicycle frames and bicycles are free of a seat tube that extends from the top tube of the frame to the bottom bracket of the frame.

Any feature or combination of features described herein are included within the scope of the present invention provided that the features included in any such combination are not mutually inconsistent as will be apparent from the context, this specification, and the knowledge of one of ordinary skill in the art. In addition, any feature or combination of features may be specifically excluded from any embodiment of the present invention. Additional advantages and aspects of the present invention are apparent in the following drawings, detailed description, and claims.

DETAILED DESCRIPTION

Figure 1:
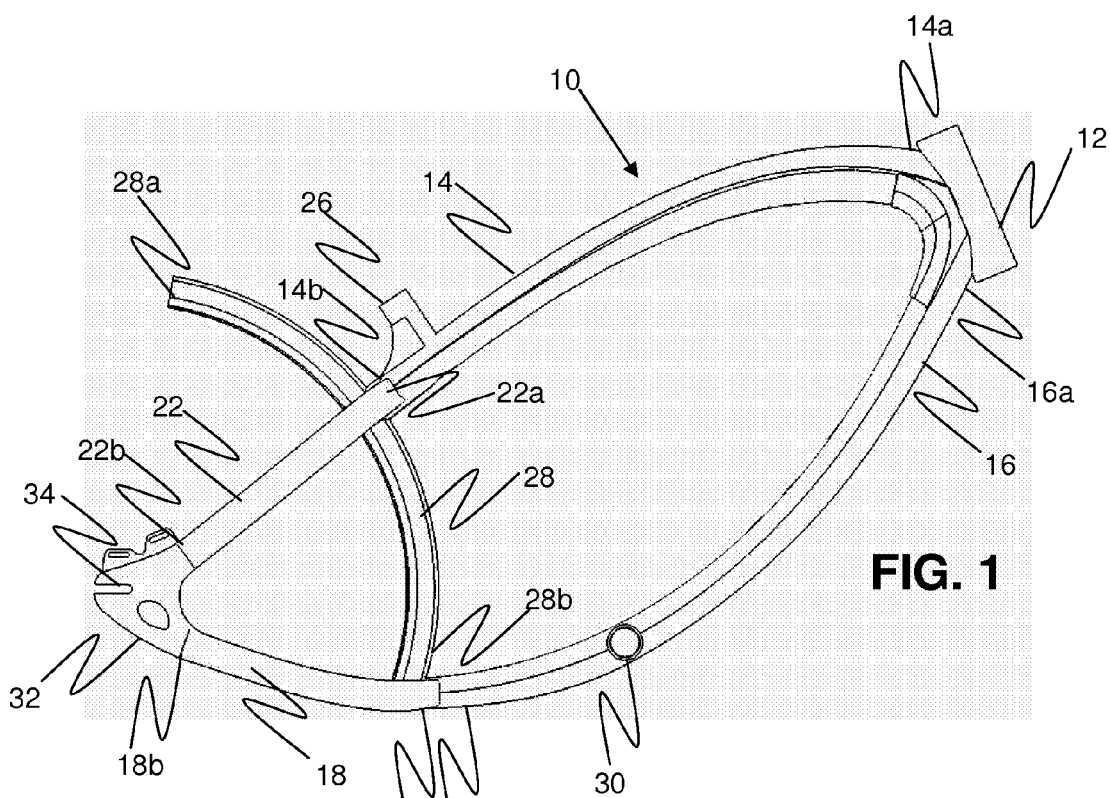
FIG. 1 is a side view of one example of the present bicycle frames.

The present bicycle frames and bicycles include a rear wheel fender that is permanently attached to the bicycle frame to provide structural support to the bicycle frame, or a portion thereof. By permanently attaching the rear wheel fender to the bicycle frame, the bicycle frame can be constructed to have a seat tube that does not extend from a top tube to a bottom bracket of the bicycle frame.

Reference will now be made in detail to the presently illustrated embodiments of the invention. Wherever possible, the same or similar reference numbers are used in the drawings and the description to refer to the same or like parts. It should be noted that the drawings are in simplified form and are not to precise scale. In reference to the disclosure herein, for purposes of convenience and clarity only, directional terms, such as, top, bottom, left, right, up, down, over, above, below, beneath, rear, front, distal, and proximal are used with respect to the accompanying drawings. Such directional terms should not be construed to limit the scope of the invention in any manner.

Although the disclosure herein refers to certain illustrated embodiments, it is to be understood that these embodiments are presented by way of example and not by way of limitation. The intent of the following detailed description, although discussing exemplary embodiments, is to be construed to cover all modifications, alternatives, and equivalents of the embodiments as may fall within the spirit and scope of the invention as defined by the appended claims.

FIG. 1 shows a bicycle frame 10. The bicycle frame 10 includes a head tube 12, a top tube 14, and a down tube 16. The head tube 12 is structured to be secured to a portion of a fork assembly (see FIG. 4 for example). For example, a portion of the fork assembly can be inserted into the inner bore of the head tube 12. Or, the fork assembly can be rotatably mounted to the head tube 12 in other configurations. The top tube 14 has a forward end 14a and a rearward end 14b. The top tube forward end 14a is attached to the head tube 12. The down tube 16 has a forward end 16a and a rearward end 16b. The down tube forward end 16a is attached to the head tube 12 at a location below the top tube 14.

The bicycle frame 10 also includes a first chainstay 18 and a second chainstay 20. The first chainstay 18 and second chainstay 20 are spaced apart by a distance sufficient to allow a wheel to be located between the first and second chainstays. The first chainstay 18 has a forward end 18a and a rearward end 18b. The second chainstay 20 has a forward end 20a and a rearward end 20b. The forward ends 18a and 20a are attached to the rearward end 16b of the down tube 16.

The bicycle frame 10 also includes a first seatstay 22 and a second seatstay 24. The first seatstay 22 has a forward end 22a and a rearward end 22b. The second seatstay 24 has a forward end 24a and a rearward end 24b. The forward ends 22a and 24a are attached to the rearward end 14b of the top tube 14. The rearward end 22b of the first seatstay 22 is located near the rearward end 18b of the first chainstay 18. The rearward end 24b of the second seatstay 24 is located near the rearward end 20b of the second chainstay 20.

Figure 2:
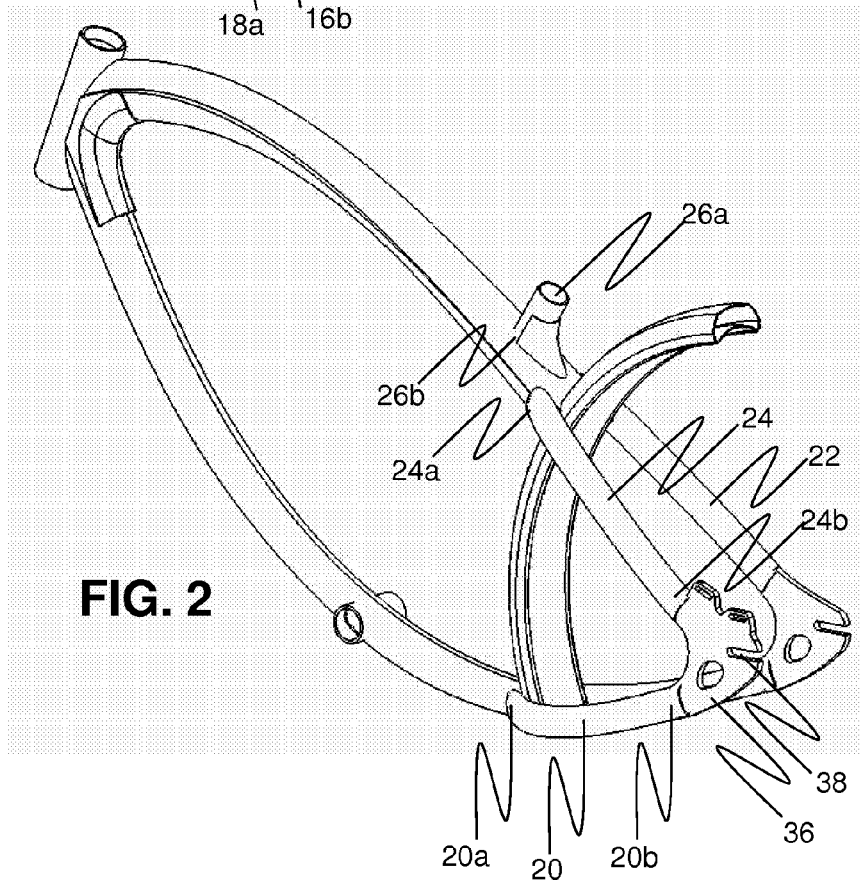
FIG. 2 is a perspective view of the left side of the bicycle frame of FIG. 1.

As shown in FIGS. 1 and 2, the first chainstay 18 and the first seatstay 22 are coupled together by a first plate 32 having a receptacle 34 that is structured to receive a portion of an axle of a wheel. Similarly, the second chainstay 20 and the second seatstay 24 are coupled together by a second plate 36 having a receptacle 38 that is structured to receive a different portion of the axle of the wheel.

The bicycle frame 10 includes a seat tube 26 attached to the top tube 14. The seat tube 26 is illustrated as having a first end 26a and a second end 26b. As shown in FIGS. 1 and 2, the second end 26b is attached to the top tube 14. As discussed herein, the illustrated embodiment of the present bicycle frame 10 includes a seat tube 26 that is attached to the top tube 14 without contacting a bottom bracket.

The present bicycle frames and bicycles also include a rear wheel fender 28. The rear wheel fender 28 is permanently attached to the bicycle frame 10. For example, in the embodiment illustrated in FIGS. 1 and 2, the rear wheel fender 28 is permanently attached to the rearward end 14b of the top tube 14 and the rearward end 16b of the down tube 16. The permanently attached rear wheel fender 28 provides structural support to the bicycle frame 10. For example, the permanently attached rear wheel fender 28 provides structural support between the top tube 14 and the down tube 16 that is conventionally provided by a seat tube that extends from the top tube to a bottom bracket. Unlike bikes which increase the size of the top tube and down tube or alter the configuration of the seat stays and other tubes to provide the support to the bicycle frame, the present bicycle frames achieve the desired amount of frame support by adding an additional component to the bicycle frame.

The rear wheel fender 28 may further be attached to one or more of the chainstays and/or one or more of the seatstays. In further embodiments, the rear wheel fender 28 is permanently attached to both the first and second chainstays and the first and second seatstays.

Figure 3:
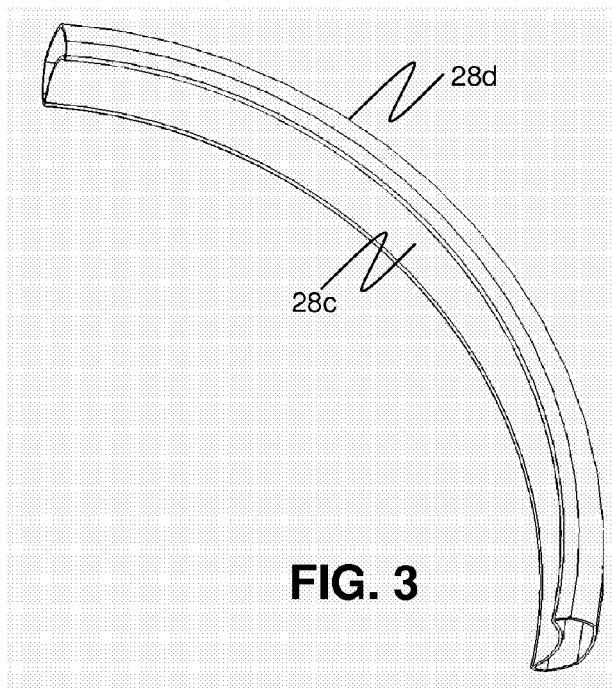
FIG. 3 is a perspective view of the rear wheel fender of the bicycle frame of FIG. 1.

The rear wheel fender 28 is illustrated as being a tubular structure, see FIG. 3. The rear wheel fender has a first end 28a, which is located above and behind the rearward end 14b of the top tube 14, and a second end 28b located near the rearward end 16b of the down tube 16. As seen in FIG. 3, the illustrated rear wheel fender 28 has a concave surface 28c which faces the rear wheel of a bicycle when the wheel is attached to the bicycle frame 10, and a convex surface 28d which faces the forward end of the bicycle frame. The ends of the rear wheel fender 28 may be open or closed. Closed ends may be desirable to prevent dirt accumulation and other materials in the body of the rear wheel fender 28.

Figure 4:
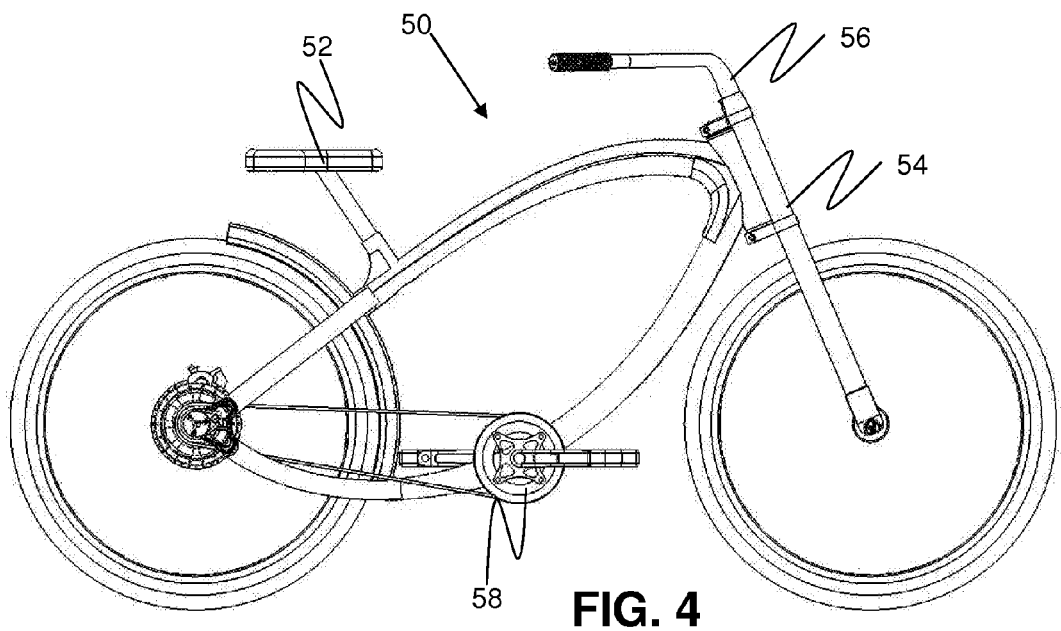
FIG. 4 is a side view of a bicycle that includes the bicycle frame of FIG. 1.

In the illustrated embodiment shown in FIGS. 1 and 2, the down tube 16 of the bicycle frame 10 includes a bottom bracket 30 that is structured to receive a portion of a pedal assembly (as shown in FIG. 4). The illustrated embodiment of the present bicycle frames includes a bottom bracket 30 that is an integral component of the down tube 16. For example, the down tube 16 and the bottom bracket 30 are formed as a single piece. In other embodiments, the bottom bracket 30 can be welded to the down tube 16, if desired. As shown in the figures, the rearward end 16b of the down tube 16 is rearwardly located relative to the bottom bracket 30.

FIG. 4 illustrates an example of the present bicycles. For example, a bicycle 50 comprises the bicycle frame 10 described herein. The bicycle 50 is also shown as further including a seat 52 attached to the seat tube 26, a fork assembly 54 attached to the head tube 12, a handlebar assembly 56 connected to the fork assembly, and a pedal assembly 58. The pedal assembly 58 includes a portion that passes through the bottom bracket 30.

In certain embodiments, the fork assembly 54 includes a shock absorber.

The present bicycle frames and bicycles can be made using conventional materials and methods, as understood by persons of ordinary skill in the art. For example, the bicycle frame can be made of metal materials, including steel, aluminum, titanium, and the like. The various components of the bicycle frame, such as the top tube, down tube, seatstay, chainstay, head tube, and rear wheel fender can be welded together to provide the desired permanent attachment. The bicycles can be made by attaching the additional components to the appropriate portions of the bicycle frame.

In view of the description herein, it can be appreciated that a rider can ride the present bicycles without damaging the frame and while being protected from debris that might come off the rear wheel of the bicycle as the rear wheel rotates since the present bicycle frames include a permanently attached rear wheel fender, as described herein.

While this invention has been described with respect to various specific examples and embodiments, it is to be understood that the invention is not limited thereto and that it can be variously practiced with the scope of the following claims. Multiple variations and modifications to the disclosed embodiments will occur, to the extent not mutually exclusive, to those skilled in the art upon consideration of the foregoing description. For example, different physical configurations of the bicycle frame components can be envisioned as well as different ways of attaching the components together. Furthermore, all the seat tube of the present bicycle frames does not contact a bottom bracket of the bicycle frame, the seat tube can extend beyond the top tube and still not contact any other portion of the bicycle frame. Additionally, other combinations, omissions, substitutions and modifications will be apparent to the skilled artisan in view of the disclosure herein. Accordingly, the present invention is not intended to be limited by the disclosed embodiments, but is to be defined by reference to the appended claims.

What is claimed is:

1. A bicycle frame, comprising:
   a head tube structured to be secured to a portion of a fork assembly;

a top tube having a forward end and a rearward end, the forward end being attached to the head tube;

a down tube having a forward end and a rearward end, the forward end of the down tube being attached to the head tube below the top tube;

first and second chainstays, each chainstay having a forward end and a rearward end, the forward end of each chainstay being attached to the rearward end of the down tube;

first and second seatstays, each seatstay having a forward end and a rearward end, the forward end of each seatstay being attached to the rearward end of the top tube, and the rearward end of the first seatstay being located near the rearward end of the first chainstay, and the rearward end of the second seatstay being located near the rearward end of the second chainstay;

a seat tube attached to the top tube; and a tubular rear wheel fender permanently attached to the rearward end of the top tube and the rearward end of the down tube to provide structural support to the bicycle frame.

2. The bicycle frame of claim 1, wherein the down tube includes a bottom bracket structured to receive a portion of a pedal assembly.

3. The bicycle frame of claim 2, wherein the bottom bracket is an integral component of the down tube.

4. The bicycle frame of claim 2, wherein the rearward end of the down tube is rearwardly located relative to the bottom bracket.

5. The bicycle frame of claim 2, wherein the seat tube is attached to the top tube without contacting the bottom bracket.

6. The bicycle frame of claim 1, wherein the first chainstay and the first seatstay are coupled together by a first plate having a receptacle structured to receive a portion of an axle of a wheel, and the second chainstay and the second seatstay are coupled together by a second plate having a receptacle to receive a different portion of the axle of the wheel.

7. The bicycle frame of claim 1, wherein the seat tube has a first end structured to receive a portion of a bicycle seat post, and a second end that is attached to the top tube.

8. The bicycle frame of claim 1, wherein the rear wheel fender is permanently attached to at least one of the chainstays and at least one of the seatstays.

9. The bicycle frame of claim 8, wherein the rear wheel fender is permanently attached to the first and second chainstays, and the first and second seatstays.

10. The bicycle frame of claim 1, wherein the rear wheel fender has a first end located above and behind the rearward end of the top tube, and a second end located near the rearward end of the down tube.

11. A bicycle, comprising a bicycle frame that comprises:

a head tube structured to be secured to a portion of a fork assembly;

a top tube having a forward end and a rearward end, the forward end being attached to the head tube;

a down tube having a forward end and a rearward end, the forward end of the down tube being attached to the head tube below the top tube;

first and second chainstays, each chainstay having a forward end and a rearward end, the forward end of each chainstay being attached to the rearward end of the down tube;

first and second seatstays, each seatstay having a forward end and a rearward end, the forward end of each seatstay being attached to the rearward end of the top tube, and the rearward end of the first seatstay being located near the rearward end of the first chainstay, and the rearward end of the second seatstay being located near the rearward end of the second chainstay;

a seat tube attached to the top tube; and a tubular rear wheel fender permanently attached to the rearward end of the top tube and the rearward end of the down tube to provide structural support to the bicycle frame.

12. The bicycle of claim 11, further comprising a seat attached to the seat tube, a fork assembly attached to the head tube, a handlebar assembly connected to the fork assembly, and a pedal assembly.

13. The bicycle of claim 12, wherein the fork assembly comprises a shock absorber.

* * * * *